INVENTOR.
ALEXANDER H. BOHR

Sept. 17, 1968  A. H. BOHR  3,401,903
SPACE TRANSPORTATION AND MAINTENANCE VEHICLE
Filed Jan. 18, 1966  5 Sheets-Sheet 2

INVENTOR.
ALEXANDER H. BOHR
BY
*William R. Wright*
AGENT

Sept. 17, 1968            A. H. BOHR            3,401,903

SPACE TRANSPORTATION AND MAINTENANCE VEHICLE

Filed Jan. 18, 1966            5 Sheets-Sheet 3

INVENTOR.
ALEXANDER H. BOHR

BY

AGENT

Sept. 17, 1968     A. H. BOHR     3,401,903
SPACE TRANSPORTATION AND MAINTENANCE VEHICLE
Filed Jan. 18, 1966     5 Sheets-Sheet 4
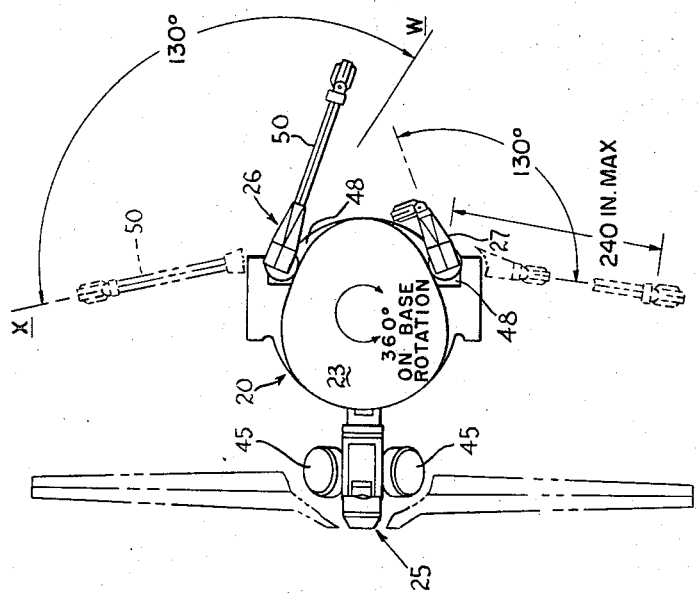
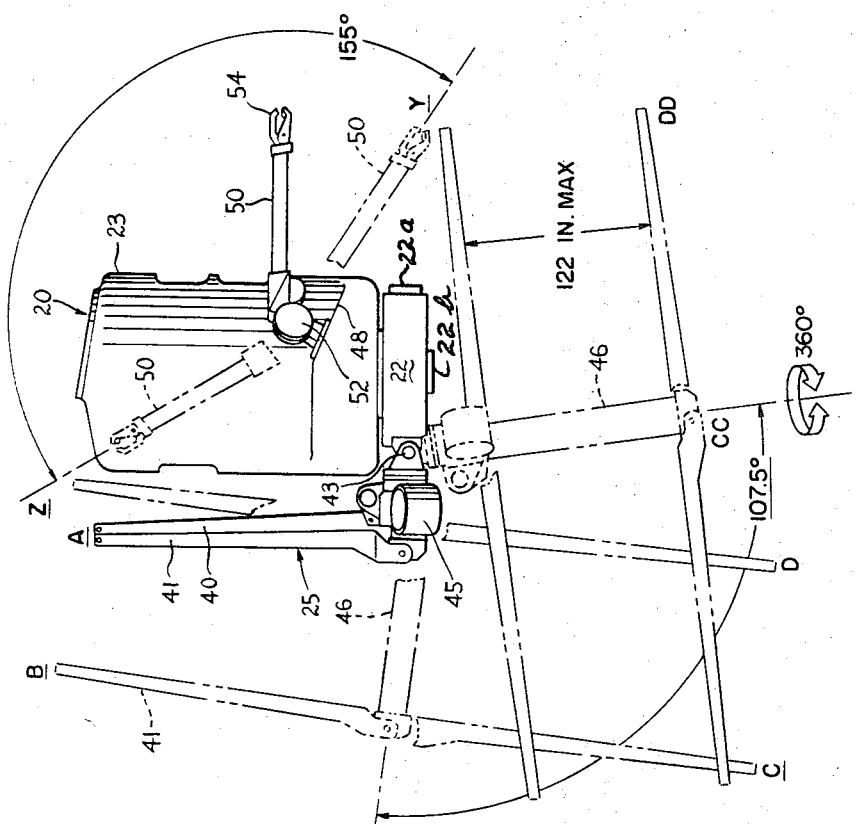
INVENTOR.
ALEXANDER H. BOHR
BY
*William R. Wright, Jr.*
AGENT

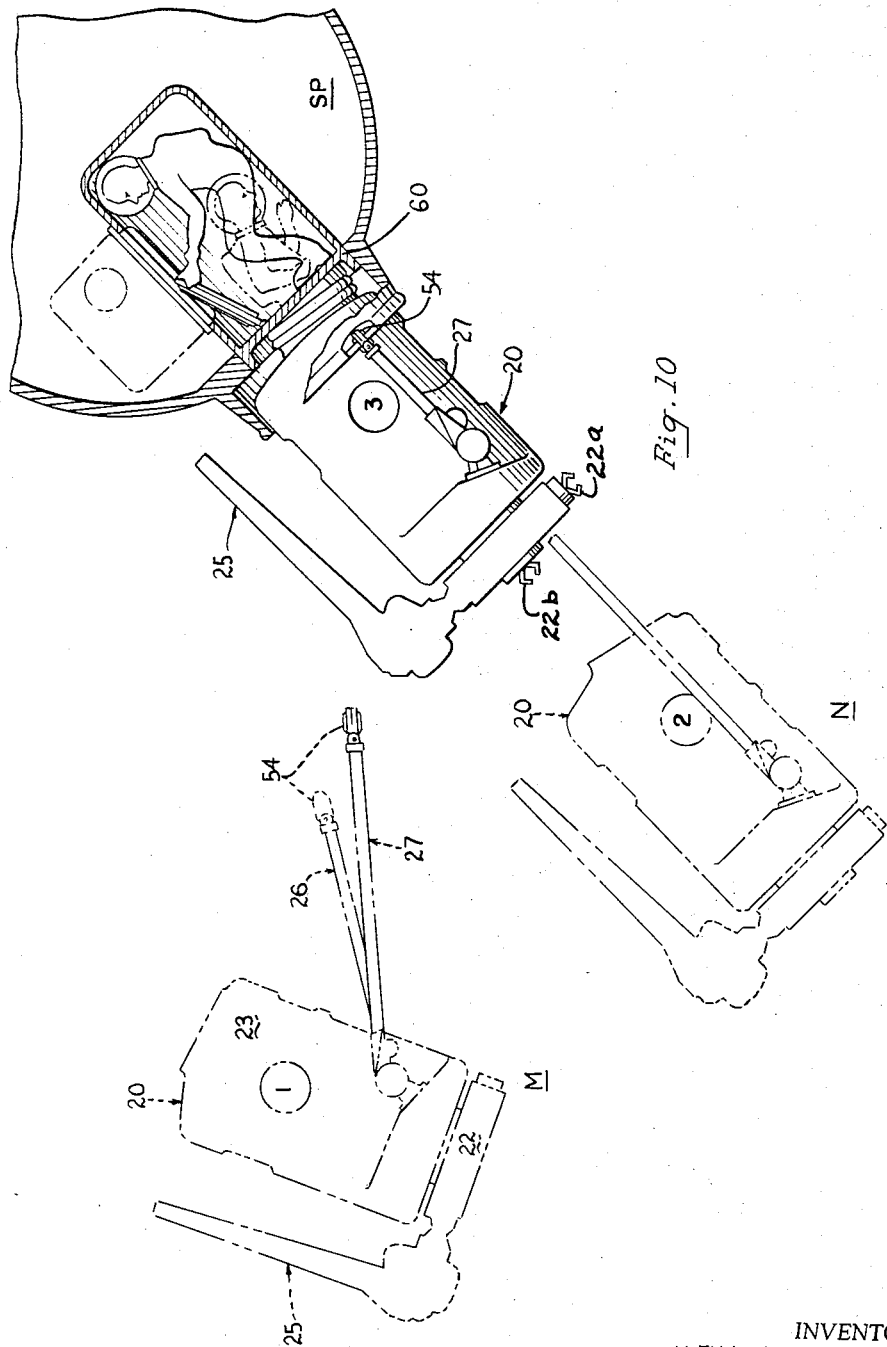

3,401,903
SPACE TRANSPORTATION AND
MAINTENANCE VEHICLE
Alexander H. Bohr, Sparta, N.J., assignor to Thiokol
Chemical Corporation, Bristol, Pa., a corporation of
Delaware
Filed Jan. 18, 1966, Ser. No. 521,366
10 Claims. (Cl. 244—1)

ABSTRACT OF THE DISCLOSURE

A space vehicle having a supporting base including rocket attitude control and propulsion means; a control cabin rotatably mounted on the base; universally mounted, base attached, extensible article gripping jaws; and universally mounted, cabin attached, extensible article gripping jaws.

---

This invention relates generally to a vehicle for use under weightless conditions such as prevail in space and more particularly to a vehicle for transporting personnel and freight and for readily manipulating the latter in outer space.

The main object of the present invention is to provide a powered space vehicle having an operator's cabin capable of transporting additional personnel, and manipulative means by which the cabin may be attached to other space craft or to bulky freight to transport the same.

An important object of the present invention is to provide a powered space vehicle having an operator's cabin and manipulative means which are universally mounted with respect to each other so as to afford great flexibility and ease of handling of the vehicle in operation.

Another important object of the present invention is to provide a powered space vehicle having an operator or control cabin and manipulative means which are so relatively movable as to enable the adjustment of the center of gravity of the vehicle to attain an optimum propulsion configuration, or to assist in the docking of the vehicle properly on the air lock of another space craft.

Other objects and advantages of the invention will become apparent during the course of the following description.

In the drawings, I have shown one embodiment of the invention. In this showing:

FIGURE 8 is a side elevational view illustrating the maneuverability of the cargo handling means with respect to the cabin of the space vehicle;

FIGURE 9 is a top plan view thereof; and

FIGURE 10 is a schematic view illustrating the technique of docking the space vehicle precisely at the air lock of another space craft.

Figure 1:
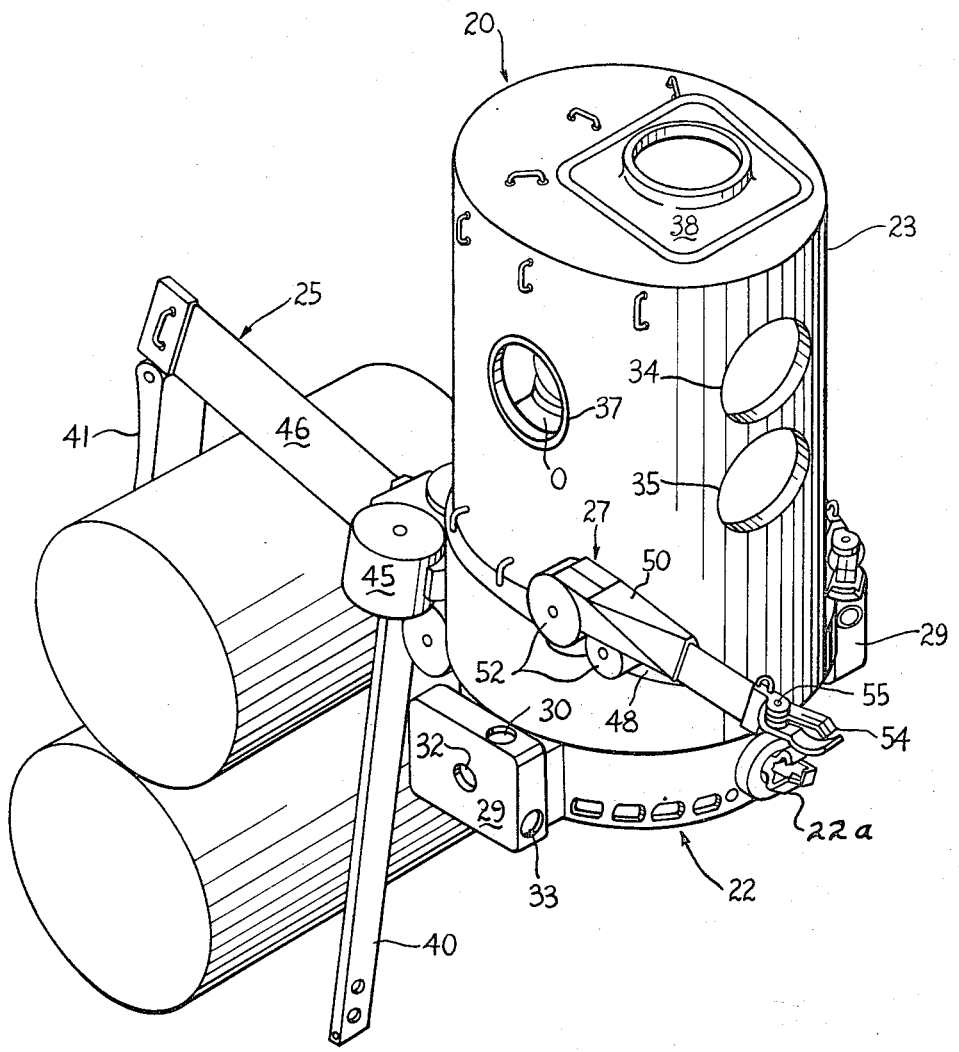
FIGURE 1 is an isometric view of the space vehicle comprising the present invention showing it carrying freight in an inverted position.

Referring to the drawings, numeral 20 designates the space vehicle comprising the present invention as a whole which comprises a powered supporting base 22, a control cabin 23, a large cargo manipulator 25, and a spaced pair of smaller manipulators 26 and 27.

The vehicle supporting base 22 may be provided with any of several rocket motor attitude control and propulsion systems and that shown includes propellant tankage 28 for supplying propellant to a plurality of rocket motors mounted in a housing 29 on each side of the base and terminating in spaced pairs of exhaust nozzles 30, 32 and 33 which afford downward, lateral and rearward propulsive effort respectively as actuated. Similarly additional rocket motors and exhaust nozzles (not shown) provide upward and forward propulsion. The rockets may be operated individually as well as in pairs to afford turning moment about any desired axis.

The control cabin 23 is mounted on the base 22 for rotation through 360 degrees about a vertical axis, such rotation being effected by conventional power means (not shown). As illustrated in the various drawing figures, excellent vision is afforded to an operator O from the cabin 23 by means of sealed glass portholes—upper 34 and lower 35 in the cabin front, rear porthole 36, side portholes 37 and hatch porthole 38. The roof of the cabin 23 is provided with an access hatch 38 which is maneuvered within the air lock of another space vehicle when the vehicle 20 is docked thereon or may be open in vacuum as required. The hatch (FIGURE 5) is mounted by means (not shown) so that it swings rearwardly closely under the cabin roof and does not require exterior means as it may be opened and closed from the interior of the cabin.

Figure 5:
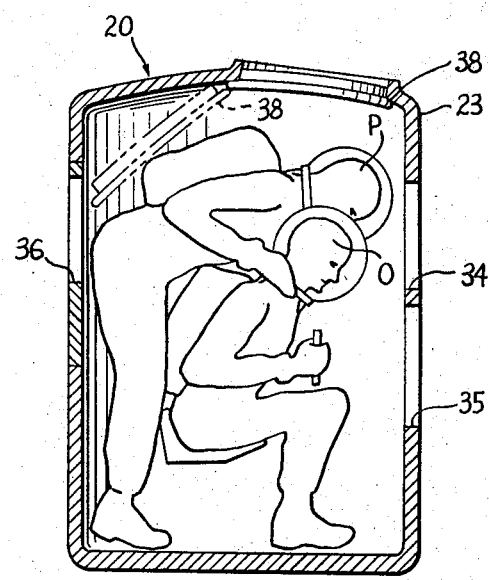
FIGURE 5 is a similar view illustrating the hatch motion and the manner of carrying additional personnel.
Figure 6:
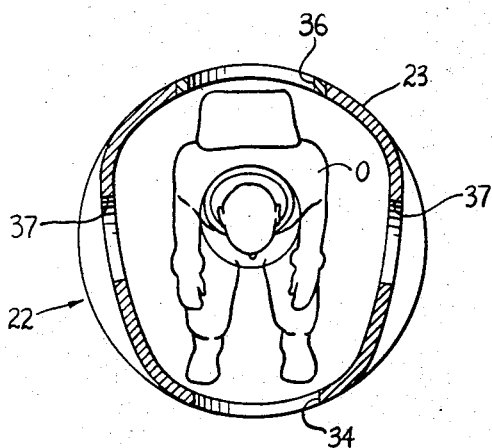
FIGURE 6 is a top plan view of the cabin showing the operator's position.
Figure 7:
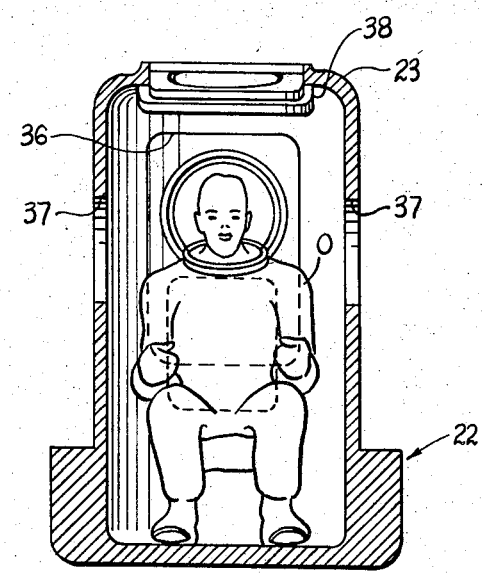
FIGURE 7 is a front elevational view thereof.

FIGURE 5 also illustrates the manner in which additional space suit equipped personnel P may be transported in the cabin 23 of the space vehicle 20 and it will be appreciated that the somewhat crouched position shown is not uncomfortable in view of the weightless conditions prevailing. The cabin 23 is, of course, provided with various operating means (not shown) to control the various mechanisms of the vehicle 20.

Figure 2:
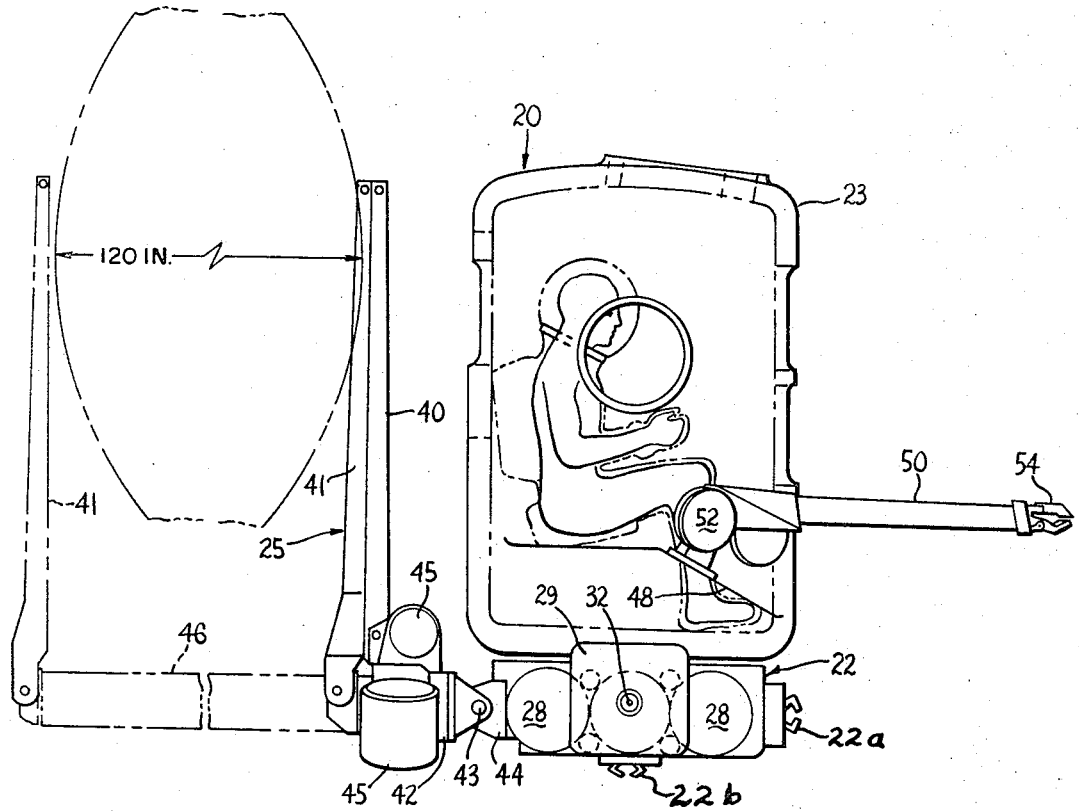
FIGURE 2 is a side elevational view thereof illustrating the extensibility of the freight or cargo handling manipulative means.
Figure 3:
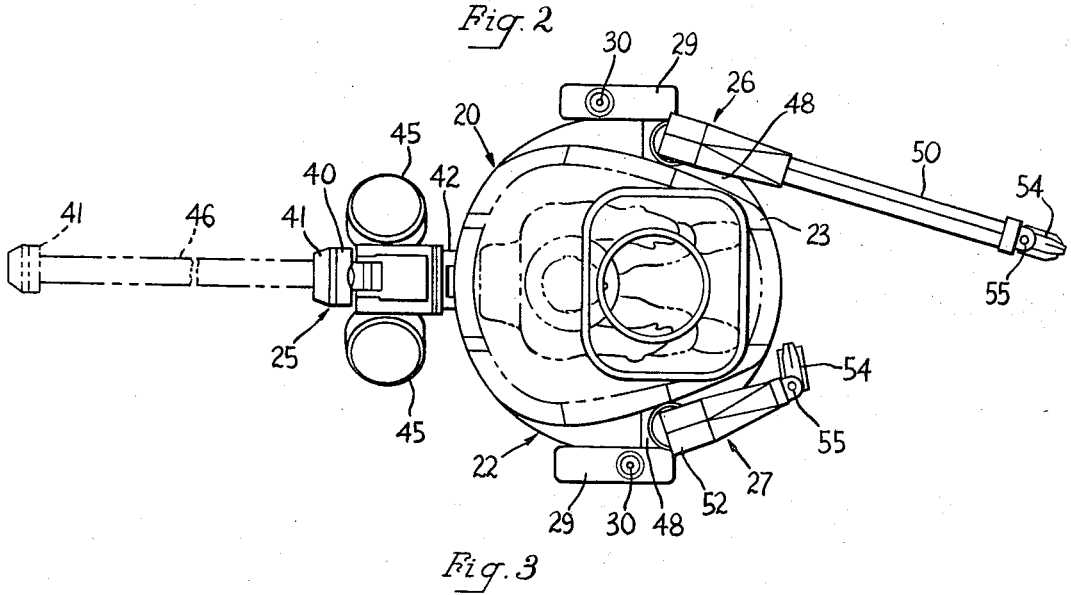
FIGURE 3 is a top plan view thereof.
Figure 4:
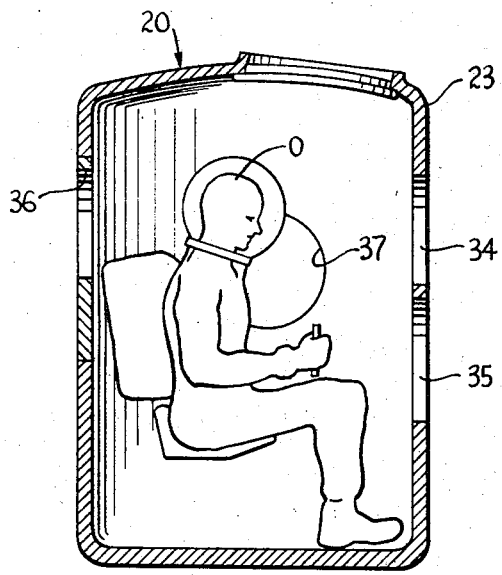
FIGURE 4 is a side elevational view of the control cabin of the space vehicle illustrating the operator's position.

The large cargo manipulator 25 comprises a pair of relatively movable, gripping or clamping jaws, one of which is horizontally rotatable on a pivot 43 connected to a support 44 which is mounted for rotation about a horizontal axis in the base 22, and driven by conventional means such as an electric motor and gears (not shown). The other jaw 41 is fixed to an extensible hollow portion of the boom 42 which in the retracted full-line position shown in FIGURES 2 and 3, is stored on the boom 42 in the form of hollow coiled strips 45 which are extensible and mutually co-operable to form the hollow triangular extended boom portion 46 shown in dotted lines. Such structure is described in detail in my copending application, Ser. No. 209,357, filed July 12, 1962.

A pair of smaller extensible manipulators 26 and 27 are pivotally mounted on sloping side shoulders 48 forming part of the cabin 23 and include extensible hollow boom portions 50 formed from stored coiled strips 52 as in the case of the large manipulator 25. A pair of gripping or clamping jaws 54 are pivotally mounted as at 55 on each of the smaller light duty manipulators 26 and 27. In addition, clamps 22a and 22b are provided on the front and bottom, respectively, of base plate 22 to permit attaching the vehicle to another vehicle or structure during work tasks.

The pivotal and rotary mountings of the manipulators 25, 26, and 27 enable the vehicle 20 to attach to or hold objects in a wide variety of positions and this important feature also permits the operator O to adjust the center of gravity of the combined vehicle and its load to obtain an optimum propulsion configuration. Such is facilitated by the 360 degree rotation possible by the cabin 23 to which the lighter duty manipulators 26 and 27 are attached.

The foregoing is shown in FIGURE 8 in which the large manipulator 25 is extensible (position A to B); pivotal about 43 to position CC, or rotatable about the horizontal axis of support 44 to position C; or rotatable and pivotable to position DD. The smaller manipulators 26 and 27 are rotatable about their pivots on the inclined shoulders 48 from position W to position X (FIGURE 9); extensible and retractable; and may be pivoted from position Y to position Z (FIGURE 8).

As is illustrated schematically in FIGURE 10, the light duty manipulators 26 and 27 may be used to greatly simplify the space vehicle docking technique. To dock on another space vehicle, platform, etc., SP, the space vehicle 20 need only be propelled by its rocket motors to the vicinity of the air lock 60, as for example at position M, upon which it extends its smaller manipulators 26 and 27 to grasp a docking hold by its clamps 54. The vehicle 20 may then be drawn through a position N and then precisely into the air lock 60 by merely retracting the smaller manipulators.

It will now be apparent that the space vehicle 20 is extremely versatile in its manipulations due to its booms and internal vehicle movements which enable A to effectively change the center of gravity which, of course, assists its propulsion requirements.

I claim:

1. A space vehicle comprising, in combination, a supporting base including rocket attitude control and propulsion means, a control cabin mounted on said base, and a large cargo manipulator comprising a first gripping jaw pivotally mounted on said base, an extensible boom universally mounted on said base at one end, and a second gripping jaw fixed to the other end of said extensible boom for cooperation with said first jaw upon extension or retraction of said extensible boom gripping jaws mounted on said base for universal pivoting movement with respect thereto.

2. The combination recited in claim 1 wherein said cabin is rotatably mounted on said base.

3. The combination recited in claim 1 and a supplementary extensible boom pivotally mounted on and exteriorly of said cabin and including end-mounted jaws for gripping other space craft to facilitate docking of the vehicle thereon.

4. The combination recited in claim 3 wherein said cabin is rotatably mounted on said base.

5. The combination recited in claim 1 wherein said control cabin is adapted for the carrying of personnel.

6. A space vehicle comprising, in combination, a supporting base including rocket propulsion means, a control cabin mounted on said base for rotation about a vertical axis, a support mounted in said base for rotation about a horizontal axis, and an extensible boom pivotally mounted on said support at one end, a first gripping jaw mounted on said boom at said one end, and a second gripping jaw fixed to the other end of said extensible boom for cooperation with said first jaw upon extension or retraction of said extensible boom.

7. The combination recited in claim 6, and additional gripping means pivotally mounted on and exteriorly of said cabin for facilitating the connection of the vehicle with other space vehicles.

8. The combination recited in claim 7 wherein said additional means are extensible outwardly from said cabin.

9. The combination recited in claim 7 wherein said cabin includes a slidable hatch operable from its interior to enable transfer of personnel between said vehicles and to and from space.

10. The combination recited in claim 6, and a supplementary extensible boom pivotally mounted on and exteriorly of said cabin and including end-mounted jaws for gripping other space craft to facilitate docking of the vehicle thereon.

References Cited

Survey of Remote Handling in Space, D. Fredrick Baker, 1st Lt. USAF (Compiler), Technical Documentary Report No. AMRL–TDR–62–100, September 1962, Cataloged by ASTIA as Ad. No. 288,863, pp. 7–10, 15–17, 30.

FERGUS S. MIDDLETON, *Primary Examiner.*